United States Patent
Matsumoto et al.

(10) Patent No.: US 10,588,024 B2
(45) Date of Patent: Mar. 10, 2020

(54) BASE STATION AND RADIO TERMINAL FOR STOPPING TRANSMISSION OF AN INTERFERENCE SIGNAL BY AN INTERFERENCE SOURCE

(71) Applicant: KYOCERA CORPORATION, Kyoto (JP)

(72) Inventors: Naohisa Matsumoto, Higashiomi (JP); Hiroyuki Urabayashi, Yokohama (JP); Kugo Morita, Yokohama (JP); Hiroyuki Adachi, Kawasaki (JP)

(73) Assignee: KYOCERA Corporation, Kyoto (JP)

( * ) Notice: Subject to any disclaimer, the term of this patent is extended or adjusted under 35 U.S.C. 154(b) by 1 day.

(21) Appl. No.: 15/751,090

(22) PCT Filed: Aug. 5, 2016

(86) PCT No.: PCT/JP2016/073169
§ 371 (c)(1),
(2) Date: Feb. 7, 2018

(87) PCT Pub. No.: WO2017/026406
PCT Pub. Date: Feb. 16, 2017

(65) Prior Publication Data
US 2018/0234855 A1 Aug. 16, 2018

(30) Foreign Application Priority Data
Aug. 11, 2015 (JP) .................... 2015-159045

(51) Int. Cl.
*H04B 7/00* (2006.01)
*H04W 16/14* (2009.01)
(Continued)

(52) U.S. Cl.
CPC ....... *H04W 16/14* (2013.01); *H04W 72/0426* (2013.01); *H04W 72/08* (2013.01);
(Continued)

(58) Field of Classification Search
CPC ......... H04W 28/0236; H04W 72/1226; H04W 92/20
(Continued)

(56) References Cited

U.S. PATENT DOCUMENTS 8,289,849 B2 * 10/2012 Ribeiro ............. H04W 74/0816
370/230
8,774,209 B2 * 7/2014 Sadek ................... H04W 16/14
370/445
(Continued)

FOREIGN PATENT DOCUMENTS

JP 2009-118320 A 5/2009

OTHER PUBLICATIONS

Intel, LBT design for LAA downlink, R1-150089, 3GPP, Feb. 2015.*
(Continued)

*Primary Examiner* — Dmitry Levitan
(74) *Attorney, Agent, or Firm* — Studebaker & Brackett PC (57) ABSTRACT

A base station (eNB 200-1) operated in a specific frequency band shared by a plurality of operators or a plurality of communication systems transmits, to another base station (eNB 200-2) operated in the specific frequency band, transmission request information requesting transmission of a predetermined signal for stopping transmission of an interference signal by an interference source (UE 100-2) causing interference to a radio terminal (UE 100-1) connected to the base station.

9 Claims, 7 Drawing Sheets

(51) Int. Cl.
  *H04W 72/08* (2009.01)
  *H04W 72/04* (2009.01)
  *H04W 74/00* (2009.01)
  *H04W 74/08* (2009.01)
  *H04W 92/20* (2009.01)

(52) U.S. Cl.
  CPC ..... *H04W 74/002* (2013.01); *H04W 74/0858* (2013.01); *H04W 92/20* (2013.01)

(58) Field of Classification Search
  USPC ................................ 370/310, 328, 329, 332
  See application file for complete search history.

(56) References Cited

U.S. PATENT DOCUMENTS

| | | | | |
|---|---|---|---|---|
| 9,420,472 | B2* | 8/2016 | Chen ..................... | H04W 16/14 |
| 9,912,438 | B2* | 3/2018 | Yerramalli ............ | H04L 1/0009 |
| 10,014,970 | B2* | 7/2018 | Zhang ................. | H04J 11/0056 |
| 10,091,815 | B2* | 10/2018 | Hampel ................ | H04W 16/14 |
| 2015/0172950 | A1* | 6/2015 | Chen ..................... | H04W 16/14 370/252 |
| 2017/0238320 | A1* | 8/2017 | Fukuta ................. | H04W 16/14 370/329 |
| 2018/0020479 | A1* | 1/2018 | Harada ................. | H04W 16/14 |
| 2018/0035311 | A1* | 2/2018 | Yang ..................... | H04W 16/32 |
| 2018/0091979 | A1* | 3/2018 | Yang .......................... | H04L 5/00 |
| 2018/0206134 | A1* | 7/2018 | Kudo ................... | H04W 24/00 |
| 2018/0234983 | A1* | 8/2018 | Matsumoto ........... | H04W 16/14 |

OTHER PUBLICATIONS

International Search Report issued in PCT/JP2016/073169; dated Oct. 25, 2016.

3rd Generation Partnership Project; Technical Specification Group Radio Access Network; Study on Licensed-Assisted Access to Unlicensed Spectrum; 3GPP TR 36.889 V13.0.0; Jun. 2015; pp. 1-285; Release 13; 3GPP Organizational Partners.

* cited by examiner

FIG. 1

- PRIOR ART -

FIG. 2

- PRIOR ART -

FIG. 3

- PRIOR ART -

BASE STATION AND RADIO TERMINAL FOR STOPPING TRANSMISSION OF AN INTERFERENCE SIGNAL BY AN INTERFERENCE SOURCE

TECHNICAL FIELD

The present application relates to a base station and a radio terminal configured to perform radio communication by using a specific frequency band.

BACKGROUND ART

In recent years, to respond to rapidly increasing traffic demands in a mobile communication system, use of a specific frequency band shared by a plurality of operators and/or a plurality of communication systems for radio communication has been discussed (see Non Patent Document 1, for example). The specific frequency band is, for example, a frequency band not requiring a license (unlicensed band).

To avoid interference with another operator and/or another communication system, a base station and a radio terminal configured to perform radio communication by using such a specific frequency band are requested to perform a clear channel determination process referred to as listen-before-talk (LBT).

The LBT is a procedure in which it is determined, based on received signal strength (interference power), whether or not a target channel in a specific frequency band is available, and only if the target channel is determined to be a clear channel, the target channel is used.

PRIOR ART DOCUMENT

Non-Patent Document

Non Patent Document 1: 3GPP technical report "TR 36.889 V13.0.0" June, 2015

SUMMARY

A base station according to one embodiment is operated in a specific frequency band shared by a plurality of operators or a plurality of communication systems. The base station comprises a controller configured to transmit, to another base station operated in the specific frequency band, transmission request information requesting transmission of a predetermined signal for stopping transmission of an interference signal by an interference source causing interference to the base station or a radio terminal connected to the base station.

DESCRIPTION OF THE EMBODIMENT

[Overview of the Embodiment]

A base station according to the embodiment is operated in a specific frequency band shared by a plurality of operators or a plurality of communication systems. The base station comprises a controller configured to transmit, to another base station operated in the specific frequency band, transmission request information requesting transmission of a predetermined signal for stopping transmission of an interference signal by an interference source causing interference to the base station or a radio terminal connected to the base station.

In the embodiment, the specific frequency band is a frequency band required to be determined, before transmitting a radio signal by using the specific frequency band, whether or not the specific frequency band is available. The predetermined signal is a radio signal for causing the interference source to determine that the specific frequency band is in use.

In the embodiment, the interference source includes at least one of a apparatus of an operator different from an operator of the base station and a apparatus of a communication system different from a communication system of the base station. The another base station is a base station of the same operator as the base station.

In the embodiment, the controller is configured to transmit the transmission request information to the another base station, based on information obtained from the radio terminal and the another base station.

In the embodiment, the controller is configured to: receive, from the another base station, interference-related information relating to the interference signal detected by the another base station, and transmit, based on the interference-related information, the transmission request information to the another base station.

In the embodiment, the controller is configured to receive, from the radio terminal, interference-related information relating to the interference signal detected by the radio terminal, and transmit, based on the interference-related information, the transmission request information to the another base station.

In the embodiment, the interference-related information includes at least one of a detection timing of the interference signal, a signal parameter applied to the interference signal, and information included in the interference signal.

In the embodiment, the controller is configured to transmit, to the another base station, stop request information requesting a transmission stop of the predetermined signal.

A base station according to the embodiment is operated in a specific frequency band shared by a plurality of operators or a plurality of communication systems. The base station comprises a controller configured to transmit a predetermined signal to stop transmission of an interference signal by an interference source causing interference to another base station or a radio terminal connected to the another base station.

In the embodiment, the controller is configured to transmit the predetermined signal if receiving, from the another base station, request information requesting transmission of the predetermined signal.

A radio terminal according to the embodiment is connected to a base station operated in a specific frequency band shared by a plurality of operators or a plurality of communication systems. The radio terminal comprises: a controller configured to transmit, to the base station, interference-related information relating to an interference signal detected by the radio terminal in the specific frequency band.

[Embodiments]
[Configuration of System]

Figure 1:
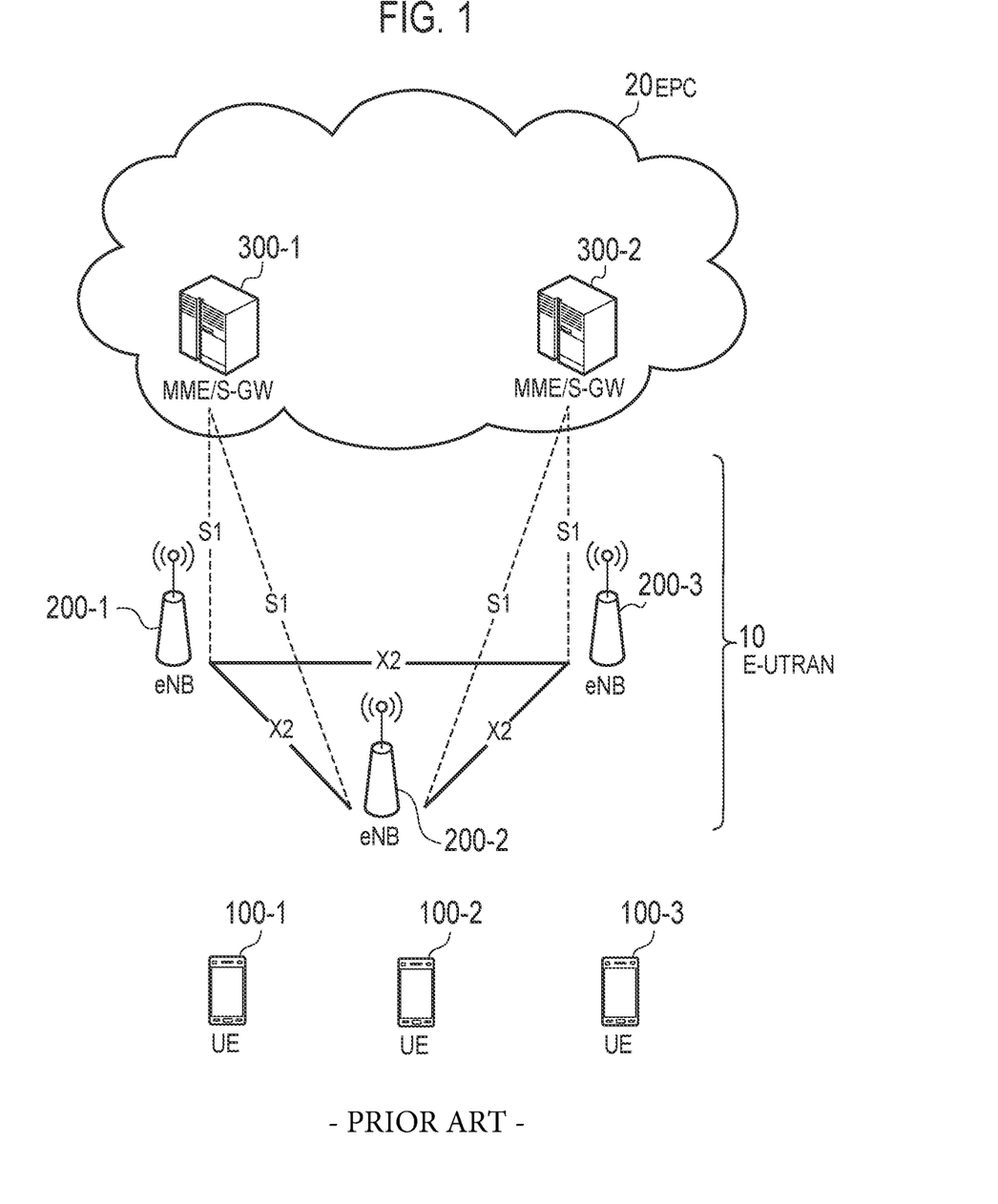
FIG. 1 is a diagram illustrating a configuration of an LTE system.

Hereinafter, an overview of an LTE system which is the mobile communication system according to the embodiments will be described below. FIG. 1 is a diagram illustrating a configuration of the LTE system according to the embodiments.

As illustrated in FIG. 1, the LTE system includes a plurality of UEs (User Equipments) 100, E-UTRAN (Evolved-UMTS Terrestrial Radio Access Network) 10, and EPC (Evolved Packet Core) 20.

The UE 100 corresponds to a radio terminal. The UE 100 is a mobile communication device and performs radio communication with eNB 200. Configuration of the UE 100 will be described later.

The E-UTRAN 10 corresponds to a radio access network. The E-UTRAN 10 includes a plurality of eNBs (evolved Node-Bs) 200. The eNB 200 corresponds to a base station. The eNBs200 are connected mutually via an X2 interface. Configuration of the eNB200 will be described later.

The eNB 200 manages one or a plurality of cells and performs radio communication with the UE 100 which is connected to the cell of the eNB 200. The eNB 200 has a radio resource management (RRM) function, a routing function for user data (hereinafter simply referred as "data"), and a measurement control function for mobility control and scheduling, and the like. It is noted that the "cell" is used as a term indicating a minimum unit of a radio communication area, and is also used as a term indicating a function of performing radio communication with the UE 100.

The EPC 20 corresponds to a core network. The EPC 20 includes a plurality of MME (Mobility Management Entity)/S-GWs (Serving-Gateways) 300. The MME performs various mobility controls and the like for the UE 100. The S-GW performs control to transfer data. MME/S-GW 300 is connected to eNB 200 via an S1 interface. The E-UTRAN 10 and the EPC 20 constitute a network.

Figure 2:
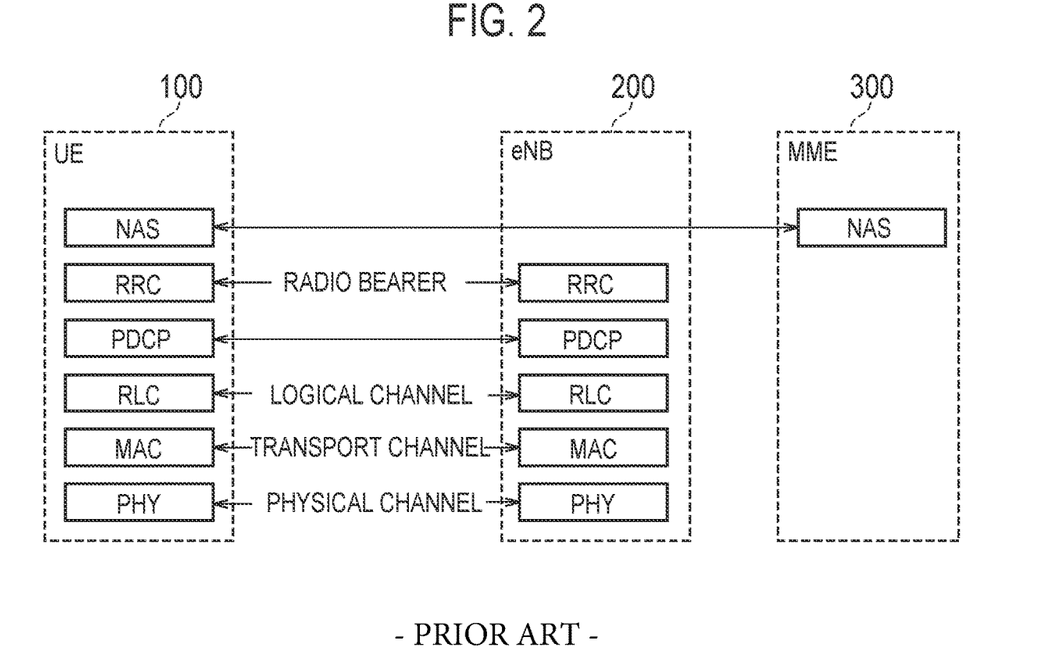
FIG. 2 is a protocol stack diagram of a radio interface in the LTE system.

FIG. 2 is a protocol stack diagram of a radio interface in the LTE system. As illustrated in FIG. 2, the radio interface protocol is classified into a layer 1 to a layer 3 of an OSI reference model, wherein the layer 1 is a physical (PHY) layer. The layer 2 includes a MAC (Medium Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, data and control signal are transmitted via the physical channel.

The MAC layer performs priority control of data, a retransmission process by hybrid ARQ (HARQ), and a random access procedure and the like. Between the MAC layer of the UE 100 and the MAC layer of the eNB 200, data and control signal are transmitted via a transport channel. The MAC layer of the eNB 200 includes a scheduler that determines a transport format of an uplink and a downlink (a transport block size and a modulation and coding scheme (MCS)) and a resource block to be assigned to the UE 100.

The RLC layer transmits data to an RLC layer of a reception side by using the functions of the MAC layer and the PHY layer. Between the RLC layer of the UE 100 and the RLC layer of the eNB 200, data and control signal are transmitted via a logical channel.

The PDCP layer performs header compression and decompression, and encryption and decryption.

The RRC layer is defined only in a control plane dealing with control signal. Between the RRC layer of the UE 100 and the RRC layer of the eNB 200, message (RRC messages) for various types of configuration are transmitted. The RRC layer controls the logical channel, the transport channel, and the physical channel in response to establishment, re-establishment, and release of a radio bearer. When there is a connection (RRC connection) between the RRC of the UE 100 and the RRC of the eNB 200, the UE 100 is in an RRC connected state, otherwise the UE 100 is in an RRC idle state.

A NAS (Non-Access Stratum) layer positioned above the RRC layer performs a session management, a mobility management and the like.

Figure 3:
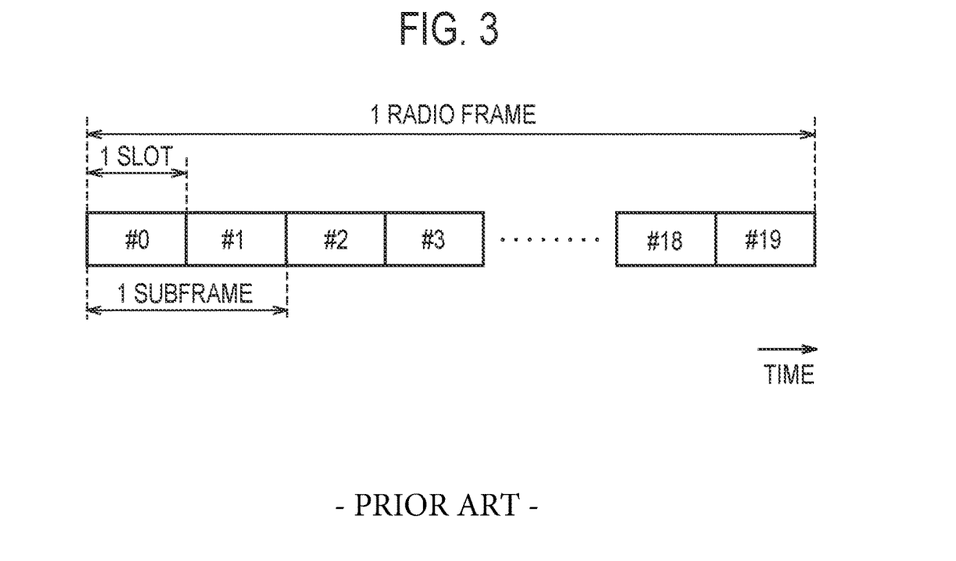
FIG. 3 is a configuration diagram of a radio frame used in the LTE system.

FIG. 3 is a configuration diagram of a radio frame used in the LTE system. In the LTE system, OFDMA (Orthogonal Frequency Division Multiplexing Access) is applied to a downlink, and SC-FDMA (Single Carrier Frequency Division Multiple Access) is applied to an uplink, respectively.

As illustrated in FIG. 3, a radio frame is configured by 10 subframes arranged in a time direction. Each subframe is configured by two slots arranged in the time direction. Each subframe has a length of 1 ms and each slot has a length of 0.5 ms. Each subframe includes a plurality of resource blocks (RBs) in a frequency direction (not shown), and a plurality of symbols in the time direction. Each resource block includes a plurality of subcarriers in the frequency direction. One symbol and one subcarrier forms one resource element. Of the radio resources (time and frequency resources) assigned to the UE 100, a frequency resource can be identified by a resource block and a time resource can be identified by a subframe (or a slot).

In the downlink, a section of several symbols at the head of each subframe is a control region used as a physical downlink control channel (PDCCH) for mainly transmitting a control signal. The details of the PDCCH will be described later. Furthermore, the other portion of each subframe is a region available as a physical downlink shared channel (PDSCH) for mainly transmitting downlink data. In each subframe, reference signals are distributed dispersed in time direction and frequency direction.

In the uplink, both ends in the frequency direction of each subframe are control regions used as a physical uplink control channel (PUCCH) for mainly transmitting an uplink control signal. Furthermore, the other portion of each subframe is a region available as a physical uplink shared channel (PUSCH) for mainly transmitting uplink data.

(Specific Frequency Band)

A specific frequency band will be described, below.

In the current LTE system, the UE 100 and the eNB 200 typically perform radio communication by using a frequency band occupied by one operator and one communication system (assigned band).

Meanwhile, in the embodiment, the UE 100 and the eNB 200 perform radio communication by using a specific frequency band. The specific frequency band is a frequency band not requiring a license (unlicensed band). Alternatively, the specific frequency band may be a frequency band requiring a license (licensed band) and be a frequency band shared by a plurality of operators and/or a plurality of communication systems. Further, the specific frequency band is a frequency band required to be determined, before transmitting a radio signal by using the specific frequency band, whether or not the specific frequency band is available. An example in which the specific frequency band is an unlicensed band will be described, below.

To avoid interference with another operator and/or another communication system (for example, WLAN system), a UE 100 and an eNB 200 configured to perform radio communication by using such an unlicensed band are requested to perform a clear channel determination process referred to as LBT. The LBT is a procedure in which it is determined, based on received signal strength (interference power), whether or not a target channel in an unlicensed band is available, and only if the target channel is determined to be a clear channel, the target channel is used.

There are two schemes of the LBT, an FBE (Frame Based Equipment) scheme and an LBE (Load Based Equipment) scheme. The FBE scheme is a scheme in which a timing is fixed. Meanwhile, the timing is not fixed in the LBE scheme.

Figure 4:
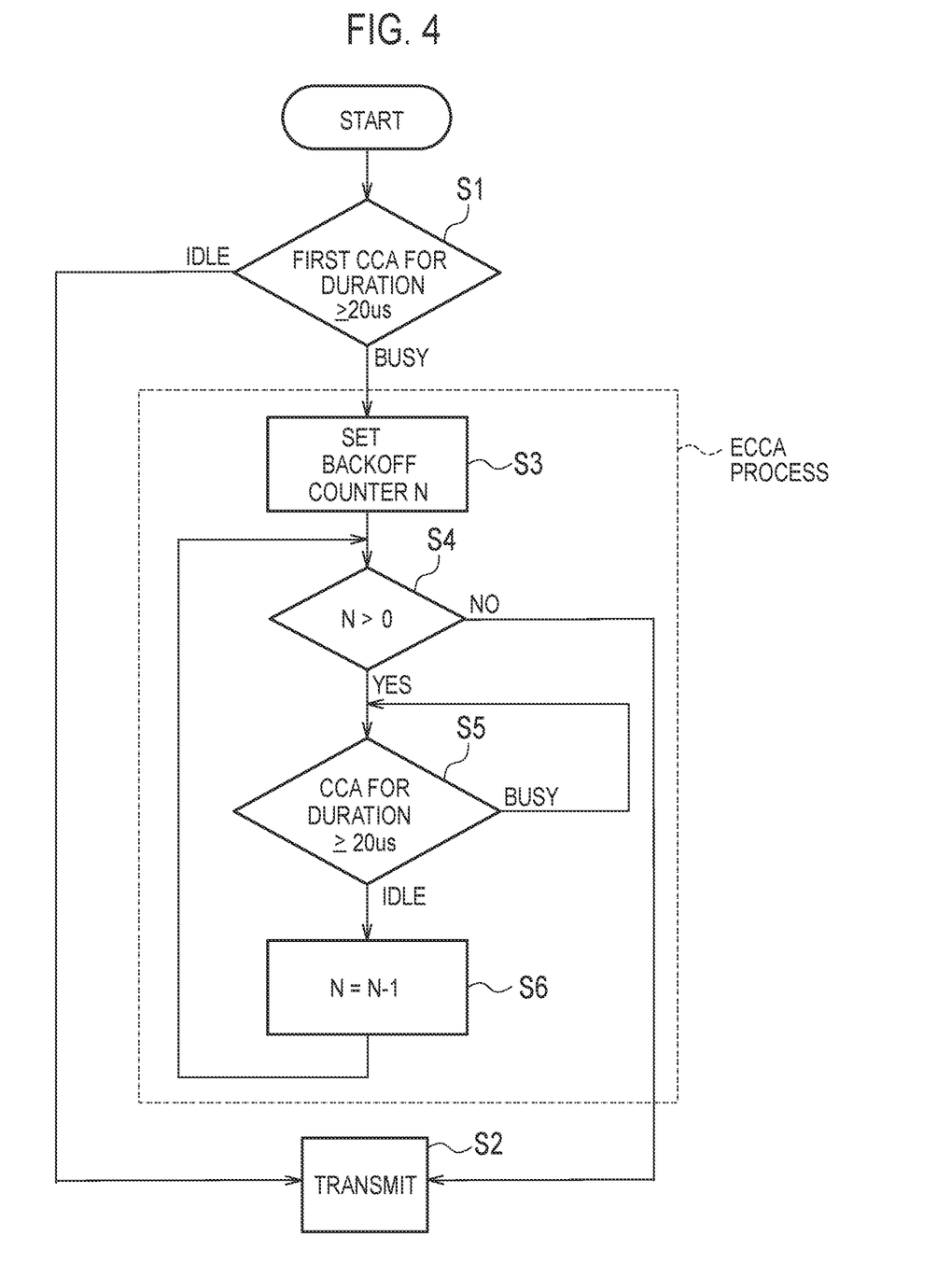
FIG. 4 is a flow chart illustrating an example of LBT of an LBE scheme.

FIG. 4 is a flow chart illustrating an example of the LBT of the LBE scheme. The UE 100 and the eNB 200 execute the present flow for a target channel in an unlicensed band. Here, an example of the eNB 200 executing the present flow will be described.

As illustrated in FIG. 4, the eNB 200 monitors the target channel and determines, based on the received signal strength (interference power), whether or not the target channel is available (step S1). Such determination is referred to as CCA (Clear Channel Assessment). Specifically, if a state where the detected power is larger than a threshold value continues for a constant period (for example, 20 μs or more), the eNB 200 determines that the target channel is in use (Busy). Otherwise, the eNB 200 determines that the target channel is available (Idle), and transmits downlink data to the UE 100 by using the target channel (step S2).

As a result of such an initial CCA, if the target channel is determined to be in use (Busy), the eNB 200 moves to an ECCA (Extended Clear Channel Assessment) process. In the ECCA process, the eNB 200 sets a counter (N) where an initial value is N (step S3). N is a random number from 4 to 32. The UE 100 decrements N (that is, subtracts 1) each time the CCA succeeds (steps S5 and S6). Upon N reaching 0 (step S4: No), the eNB 200 determines that the target channel is available (Idle) and transmits a radio signal by using the target channel (step S2).

(LAA)

The LTE system according to the embodiment can use, for the radio terminal (for LTE communication), not only a licensed band for which the license is granted to operators, but also an unlicensed band not requiring the license. For example, with an aid of the licensed band, it is possible to access the unlicensed band. Such mechanism is referred to as licensed-assisted access (LAA).

Figure 5:
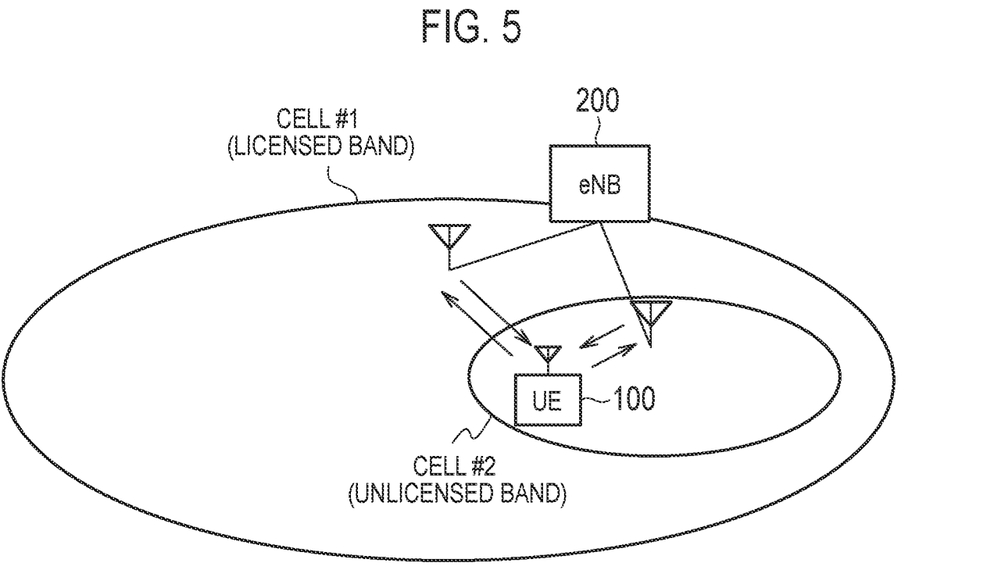
FIG. 5 is a diagram for describing an LAA.

FIG. 5 is a diagram for describing the LAA. As illustrated in FIG. 5, the eNB 200 manages a cell #1 operated in the licensed band and a cell #2 operated in the unlicensed band. In FIG. 5, an example is illustrated where the cell #1 is a macro cell and the cell #2 is a small cell, but a cell size is not limited to this.

The UE 100 is located in an overlapping area of the cell #1 and the cell #2. The UE 100 sets the cell #1 as a primary cell (PCell), while setting the cell #2 as a secondary cell (SCell) and performs communication by carrier aggregation (CA). In the example of FIG. 5, the UE 100 performs uplink communication and downlink communication with the cell #1 and performs uplink communication and downlink communication with the cell #2. The UE 100 may perform only downlink communication with the cell #2. Such carrier aggregation provides the UE 100 with a radio resource of the unlicensed band in addition to a radio resource of the licensed band, and thus, throughput can be improved. For downlink control information (DCI) such as resource allocation information in the unlicensed band, the eNB 200 may notify the UE 100 of the information via the licensed band, or may notify the UE 100 of the information via the unlicensed band.

(Radio Terminal)

Figure 6:
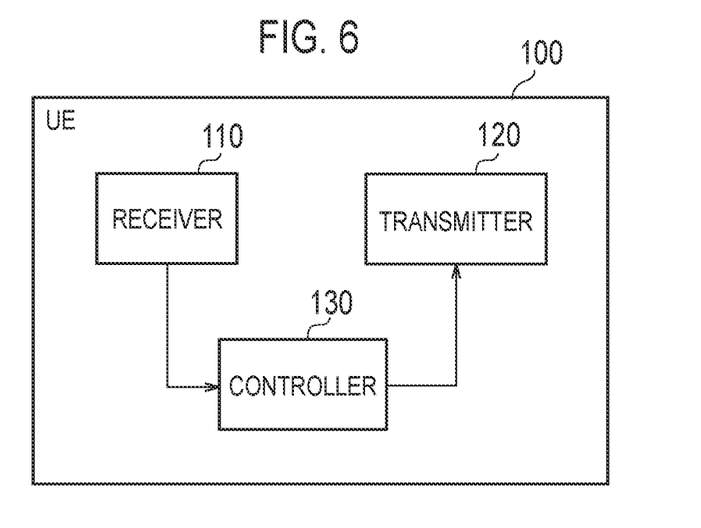
FIG. 6 is a block diagram of a UE (radio terminal).

A configuration of the UE 100 (radio terminal) will be described, below. FIG. 6 is a block diagram of the UE 100. As illustrated in FIG. 6, the UE 100 includes: a receiver 110, a transmitter 120, and a controller 130.

The receiver 110 performs various types of receptions under the control of the controller 130. The receiver 110 includes an antenna and a receiver unit. The receiver unit converts a radio signal received by the antenna into a baseband signal (received signal), and outputs the baseband signal to the controller 130. The receiver 110 may include a first receiver unit configured to receive a radio signal in the assigned band, and a second receiver unit configured to receive a radio signal in the unlicensed band.

The transmitter 120 performs various types of transmissions under the control of the controller 130. The transmitter 120 includes an antenna and a transmitter unit. The transmitter unit converts a baseband signal (transmitted signal) output from the controller 130 into a radio signal, and transmits the radio signal from the antenna. The transmitter 120 may include a first transmitter unit configured to transmit a radio signal in the assigned band, and a second transmitter unit configured to transmit a radio signal in the unlicensed band.

The controller 130 performs various types of controls in the UE 100. The controller 130 includes a processor and a memory. The memory stores a program executed by the processor, and information used for a process by the processor. The processor includes a baseband processor configured to perform modulation and demodulation, coding and decoding, and the like on a baseband signal, and a CPU (Central Processing Unit) configured to execute the program stored in the memory to perform various types of processes. The processor may include a codec that performs coding and decoding on sound and video signals. The processor executes various types of processes described above, and various types of processes described later.

(Base Station)

Figure 7:
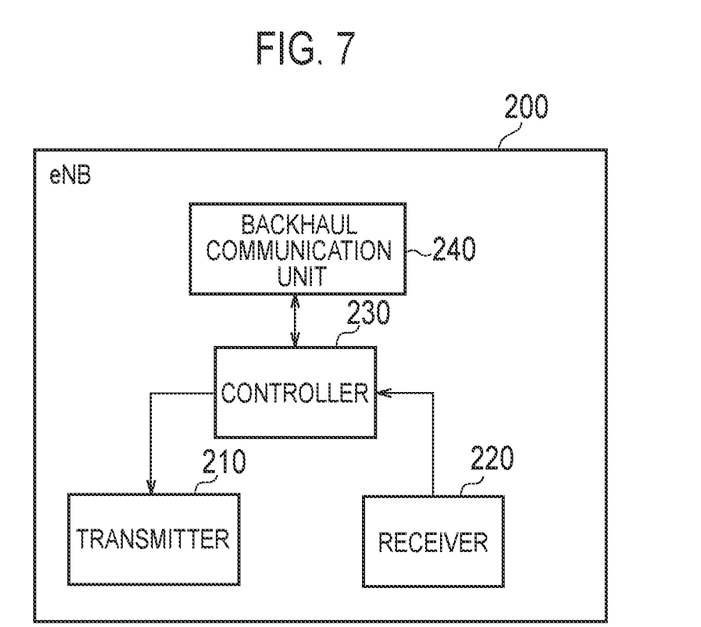
FIG. 7 is a block diagram of an eNB (base station).

A configuration of the eNB 200 (base station) will be described, below. FIG. 7 is a block diagram of the eNB 200. As illustrated in FIG. 7, the eNB 200 includes: a transmitter 210, a receiver 220, a controller 230, and a backhaul communication unit 240.

The transmitter 210 performs various types of transmissions under the control of the controller 230. The transmitter 210 includes an antenna and a transmitter unit. The transmitter unit converts a baseband signal (transmitted signal) output from the controller 230 into a radio signal, and transmits the radio signal from the antenna. The transmitter 210 may include a first transmitter unit configured to transmit a radio signal in the licensed band, and a second transmitter unit configured to transmit a radio signal in the unlicensed band.

The receiver 220 performs various types of receptions under the control of the controller 230. The receiver 220 includes an antenna and a receiver unit. The receiver unit converts a radio signal received by the antenna into a baseband signal (received signal), and outputs the baseband signal to the controller 230. The receiver 220 may include a first receiver unit configured to receive a radio signal in the licensed band, and a second receiver unit configured to receive a radio signal in the unlicensed band.

The controller 230 performs various types of controls in the eNB 200. The controller 230 includes a processor and a memory. The memory stores a program executed by the processor, and information used for a process by the processor. The processor includes a baseband processor configured to perform modulation and demodulation, coding and decoding, and the like on a baseband signal, and a CPU (Central Processing Unit) configured to execute the program stored in the memory to perform various types of processes. The processor executes various types of processes described above, and various types of processes described later.

The backhaul communication unit 240 is connected to a neighbour eNB 200 via the X2 interface and is connected to the MME/S-GW 300 via the S1 interface. The backhaul communication unit 240 is used for communication performed on the X2 interface, communication performed on the S1 interface, and the like.

(Operation Environment According to Embodiment)

Figure 8:
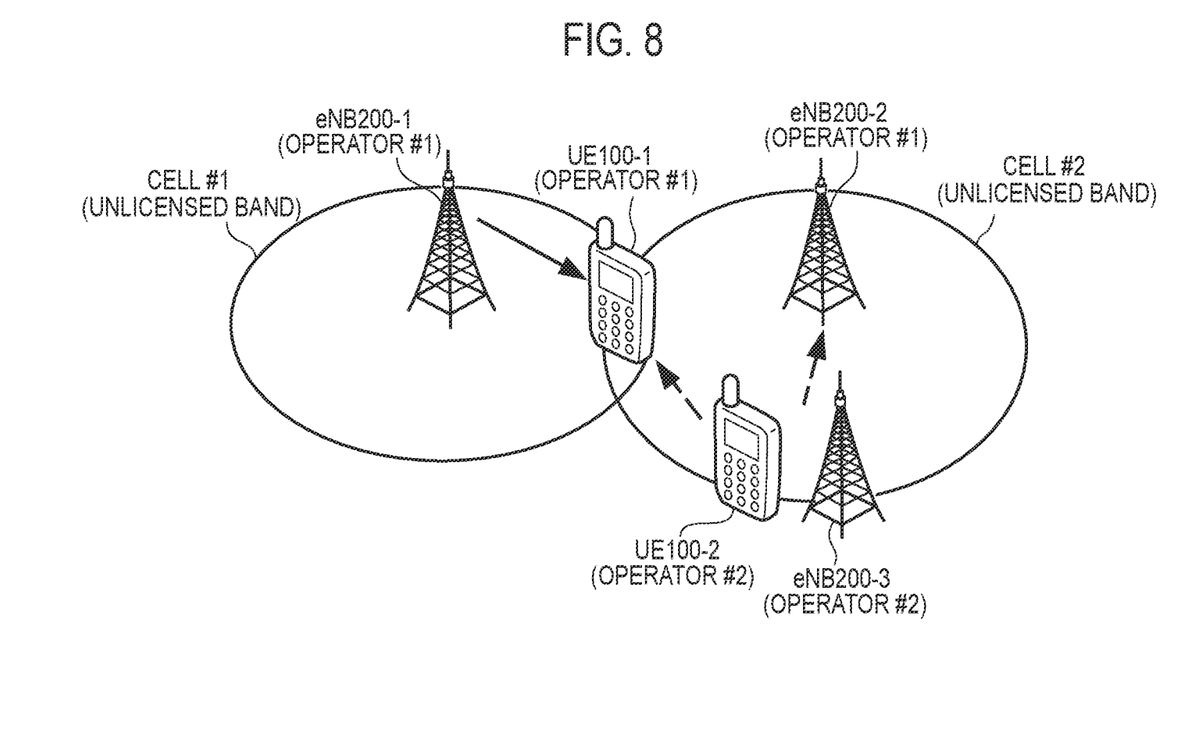
FIG. 8 is a diagram illustrating an operation environment according to an embodiment.

FIG. 8 is a diagram illustrating an operation environment according to the embodiment.

As illustrated in FIG. 8, an eNB 200-1 and an eNB 200-2 of the same operator #1 and an eNB 200-3 of another operator #2 are provided. Each of the eNBs 200 (the eNB 200-1 to the eNB 200-3) is operated in an unlicensed band. Specifically, each of the eNBs 200 manages a cell of the unlicensed band. FIG. 8 illustrates an example in which the eNB 200-1 manages a cell #1 of the unlicensed band and the eNB 200-2 manages a cell #2 of the unlicensed band. Meanwhile, a UE 100-2 and the eNB 200-3 of the other operator #2 are located in the vicinity of the cell #2.

It is noted that each of the eNBs 200 (the eNB 200-1 to the eNB 200-3) may manage not only a cell of the unlicensed band but also a cell of the licensed band.

The UE 100-1 of the operator #1 is located in the cell #1 of the eNB 200-1. The UE 100-1 is in a connected mode (RRC connected mode) in the cell #1. In other words, the UE 100-1 is connected to the eNB 200-1 operated in the unlicensed band. The LAA may be applied to the UE 100-1. Specifically, the UE 100-1 sets another cell (licensed band) of the eNB 200-1 as a primary cell (PCell), and sets the cell #1 of the eNB 200-1 as a secondary cell (SCell).

In the unlicensed band, it is assumed that among the same operator, a cell design is achieved by taking into consideration the interference. However, interference between different operators may occur in the unlicensed band. FIG. 8 illustrates an example in which in the unlicensed band, the UE 100-1 and the eNB 200-2 of the operator #1 receive interference, that is, receive an interference signal, from the UE 100-2 of the other operator #2. It is noted that the eNB 200-1 does not receive an interference signal from an interference source (the UE 100-2). Therefore, the UE 100-2 is a hidden interference source terminal (a so-called hidden terminal) for the eNB 200-1. Alternatively, the eNB 200-1 may receive the interference signal from the interference source (the UE 100-2) and may detect the interference.

If the UE 100-1 is affected by interference from another operator and/or another communication system in the unlicensed band, the quality of the radio signal received by the UE 100-1 from the eNB 200-1 (that is, downlink communication quality) deteriorates. Further, as the LBT is requested in the unlicensed band, if the UE 100-1 is affected by the interference from the other operator and/or the other communication system, transmission occasions of the UE 100-1 in the unlicensed band are limited.

(Operation According to Embodiment)

Figure 9:
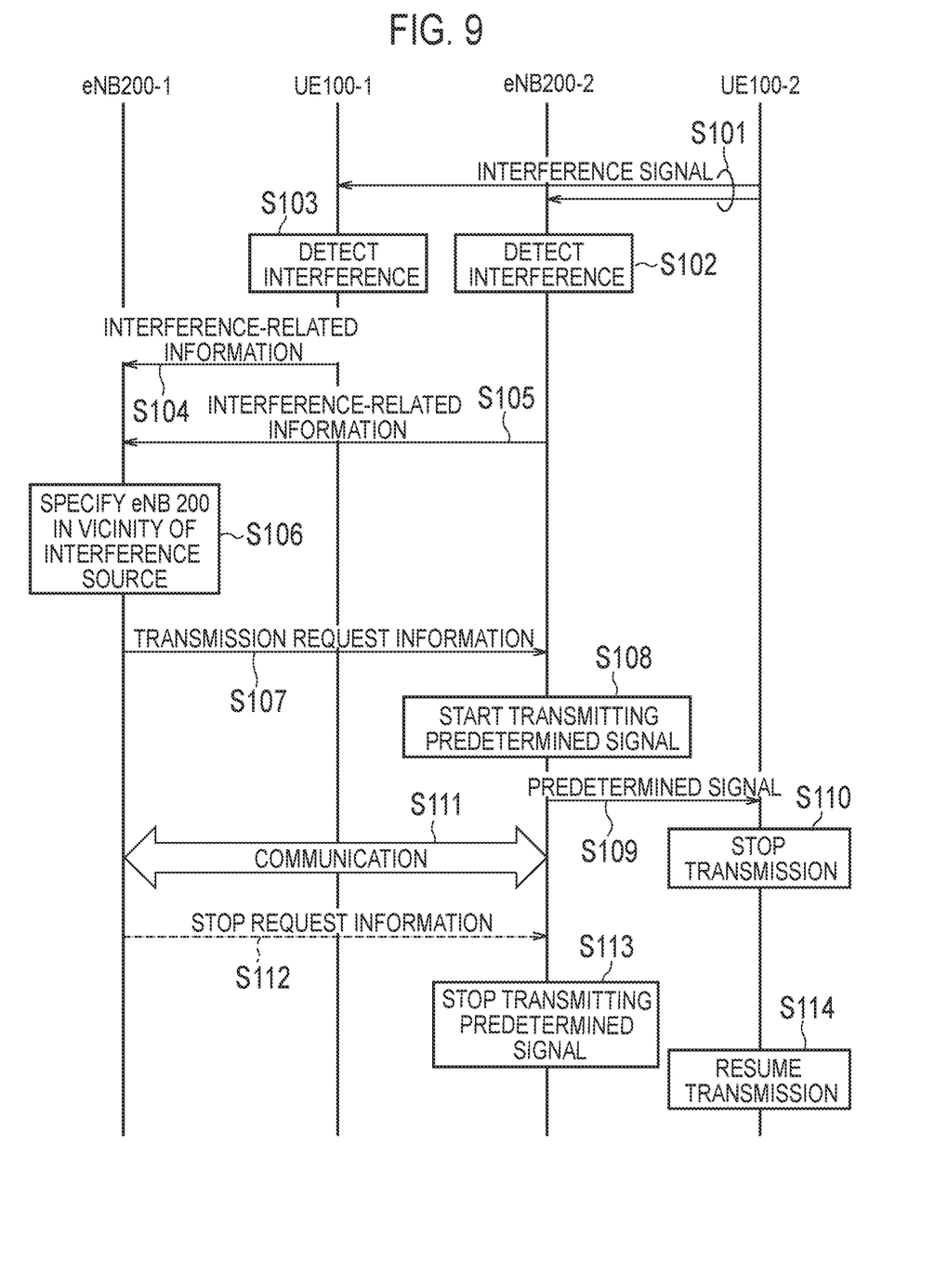
FIG. 9 is a sequence diagram illustrating an operation according to the embodiment.

An operation according to the embodiment will be described, below. Here, an operation for removing interference from a hidden terminal (the UE 100-2) in the operation environment illustrated in FIG. 8 will be described. FIG. 9 is a sequence diagram illustrating the operation according to the embodiment. In FIG. 9, communication between the eNBs 200 is performed on the X2 interface, for example.

As illustrated in FIG. 9, in step S101, the UE 100-2 transmits a radio signal to the eNB 200-3 by using the unlicensed band. The UE 100-1 and the eNB 200-2 receive the radio signal transmitted by the UE 100-2 as an interference signal in the unlicensed band.

In step S102, the eNB 200-2 detects the interference signal. For example, during LBT (CCA), the eNB 200-2 detects the interference signal based on the received signal strength (RSSI). Specifically, if a state where the RSSI used for the interference level is larger than a threshold value continues for a constant period, the eNB 200 determines that the interference signal is detected. The eNB 200-2 preferably detects an interference signal from another operator or another communication system. To detect such an interference signal, a measurement timing of the RSSI may be improved. For example, by performing the RSSI measurement at a timing when the UE 100 and/or the eNB 200 of the operator of the eNB 200-2 does not perform transmission, the eNB 200-2 can grasp more precisely the RSSI from another operator or another communication system. Further, the eNB 200-2 may set, in the UE 100, a gap for stopping transmission by the UE 100 in the cell of the eNB 200-2, during the RSSI measurement. Such a gap may be regularly provided.

Alternatively, the eNB 200-2 may measure the RSSI while communicating with the UE 100 and may detect the interference signal based on the RSSI. For example, the eNB 200-2 measures RSRP of another eNB 200 and/or UE 100 of the operator of the eNB 200-2, and calculates, as an interference level from another operator, a value obtained by subtracting RSRP from the RSSI measured by the eNB 200-2. Then, if a state where the calculated interference level is larger than a threshold value continues for a constant period, the eNB 200-2 determines that the interference signal is detected. It is noted that the eNB 200-2 can identify a reference signal used in the operator of the eNB 200-2, and thus, can suitably perform RSRP measurement for the operator of the eNB 200-2. It is noted that RSSI is a measurement in units of resource blocks, while RSRP is a measurement in units of resource elements, and thus, a conversion process to adjust the units is needed.

In step S103, the UE 100-1 detects the interference signal. A method of detecting an interference signal in the UE 100-1 is similar to the method of detecting an interference signal in the eNB 200-2.

In step S104, the UE 100-1 transmits, to the eNB 200-1, interference-related information relating to the interference signal detected in step S103. The eNB 200-1 receives the interference-related information from the UE 100-1.

In a case of applying the LAA, the UE 100-1 may transmit the interference-related information to the eNB 200-1 by using a primary cell (licensed band). Thereby, even when the unlicensed band cannot be used due to LBT, the interference-related information can be transmitted to the eNB 200-1.

The UE 100-1 may include the interference-related information into a measurement report and transmit the report to the eNB 200-1. The measurement report is a type of RRC signaling. Based on a measurement configuration (Measurement Config.) from the eNB 200-1, the UE 100-1 may perform detection of the interference signal and measurement reporting. Such a measurement configuration may include information designating the detection of the interference signal as a transmission trigger of the measurement report.

In step S105, the eNB 200-2 transmits, to the eNB 200-1, interference-related information relating to the interference signal detected in step S102. In response to reception of the interference-related information from the UE 100-1, the eNB 200-1 may request, to the eNB 200-2, transmission of the interference-related information. In this case, the eNB 200-2 transmits the interference-related information to the eNB 200-1 in response to the request from the eNB 200-1. The eNB 200-1 receives the interference-related information from the eNB 200-2.

The interference-related information includes a detection timing of the interference signal. The detection timing of the interference signal is expressed by parameters such as a radio frame number, a subframe number, and a symbol number. Alternatively, the detection timing of the interference signal may be expressed by a detection time (for example, hour, minute, and second) of the interference signal. Alternatively, if the UE 100-1 and the eNB 200-2 analyze the interference signal, the interference-related information may include at least one of a signal parameter applied to the interference signal and information included in the interference signal. The signal parameter applied to the interference signal is, for example, a signal sequence of a reference signal included in the interference signal, time-frequency resources (resource blocks) used for transmitting the interference signal, and the like. The information included in the interference signal is a transmission source ID (UE identification information) included in the interference signal, and the like.

In step S106, the eNB 200-1 determines, based on the interference-related information obtained from the UE 100-1 and the eNB 200-2, that the interference source (the UE 100-2) causing interference to the UE 100-1 is located in the vicinity of the eNB 200-2. For example, if the interference-related information from the UE 100-1 and the interference-related information from the eNB 200-2 match, the eNB 200-1 determines that the interference source (the UE 100-2) causing interference to the UE 100-1 is located in the vicinity of the eNB 200-2. In this manner, the eNB 200-1 specifies the eNB 200-2 as the eNB 200 located in the vicinity of the UE 100-2 being the hidden terminal, from among the eNBs 200 of the operator of the eNB 200-1 (operator #1).

In step S107, the eNB 200-1 transmits, to the eNB 200-2, transmission request information requesting transmission of a predetermined signal for stopping transmission of the interference signal by the interference source causing interference to the UE 100-1. The eNB 200-2 receives the transmission request information. Here, the predetermined signal is a radio signal for causing the interference source to determine that the unlicensed band is in use. The predetermined signal may be at least one of a reference signal, a control signal, and data.

In step S108, the eNB 200-2 transmits the predetermined signal by using the unlicensed band, in response to reception of the transmission request information. Specifically, the eNB 200-2 starts transmission of the predetermined signal upon reception of the transmission request information and successful LBT. It is preferable that the eNB 200-2 continuously transmits the predetermined signal. The eNB 200-2 may transmit, to the eNB 200-1, information indicating a transmission start of the predetermined signal. The information may include the fact that transmission of the predetermined signal is started, or an estimated timing of the transmission start of the predetermined signal.

In step S109, the UE 100-2 receives the predetermined signal from the eNB 200-2 in the unlicensed band.

It is noted that the predetermined signal may be a signal that is intended for a specific equipment and is transmitted by unicast or broadcast, for example. Alternatively, the predetermined signal may simply be an interference signal generated from a random sequence.

In step S110, the UE 100-2 determines that the unlicensed band is in use during the LBT, in response to the reception of the predetermined signal. As a result, the UE 100-2 fails in the LBT and stops transmission of the radio signal (interference signal). It is noted that if the UE 100-2 has already stopped the transmission for a constant time or more, or if a data amount accumulated on a buffer exceeds a threshold value, the UE 100-2 may perform control not according to the predetermined signal.

In step S111, the eNB 200-1 and the UE 100-1 perform radio communication (downlink communication and/or uplink communication) by using the unlicensed band. Here, the interference from the UE 100-2 is removed, and thus, the eNB 200-1 and the UE 100-1 can perform satisfactory radio communication.

In step S112, the eNB 200-1 transmits, to the eNB 200-2, stop request information requesting a transmission stop of the predetermined signal. The eNB 200-1 may stop the radio communication with the UE 100-1 and transmit the stop request information to the eNB 200-2, after performing radio communication for only a constant period defined in advance or radio communication of only a constant data amount. The stop request information may include the fact that the radio communication with the UE 100-1 is stopped, or an estimated timing for stopping the radio communication with the UE 100-1.

In step S113, the eNB 200-2 stops transmission of the predetermined signal, in response to reception of the stop request information. It is noted that the eNB 200-2 may stop transmission of the predetermined signal by a trigger other than the reception of the stop request information. For example, if a period is defined in advance during which the predetermined signal can be continuously transmitted, expiration of the period is a trigger for the eNB 200-2 to stop transmission of the predetermined signal. Alternatively, information for designating a period during which the predetermined signal needs to be continuously transmitted may be included in the transmission request information. In this case, expiration of the period designated by the transmission request information is a trigger for the eNB 200-2 to stop transmission of the predetermined signal.

In step S114, the UE 100-2 does not receive the predetermined signal from the eNB 200-2 in the unlicensed band any more, and thus, determines that the unlicensed band is available during the LBT. As a result, the UE 100-2 succeeds in the LBT and resumes transmission of the radio signal (interference signal).

(Summary of Embodiment)

The eNB 200-1 transmits, to the eNB 200-2, transmission request information requesting transmission of a predetermined signal for stopping transmission of an interference signal by the interference source (the UE 100-2) causing interference to the UE 100-1 connected to the eNB 200-1. The eNB 200-2 transmits the predetermined signal by using the unlicensed band, in response to reception of the transmission request information. Thereby, the transmission of the interference signal from the interference source (the UE 100-2) can be stopped, and thus, the eNB 200-1 and the UE 100-1 can perform satisfactory radio communication in the unlicensed band. Further, as a result of satisfactory radio communication, it is expected that the radio communication between the eNB 200-1 and the UE 100-1 is completed within a short time. Thus, after completion of the radio communication, the UE 100-2 can perform satisfactory radio communication with the eNB 200-3 in the unlicensed band.

[Other Embodiments]

In the operation according to the above-described embodiment (FIG. 9), steps S102 and S105 may be omitted. The eNB 200-1 can grasp a proximal eNB 200-2, based on the measurement report of the UE 100-1, and the like.

Moreover, in the operation according to the above-described embodiment (FIG. 9), if the eNB 200-1 itself detects the interference, steps S101 to S105 may be omitted. In this case, the eNB 200-1 transmits the transmission request information to the eNB 200-2 (step S107) without being based on steps S101 to S105.

In the above-described embodiment, an example is described in which the interference source is a apparatus (the UE 100-2) of the operator #2 different from the operator #1 of the eNB 200-1. However, the interference source may be a apparatus of a communication system (for example, the WLAN system) different from the communication system of the eNB 200-1 (the LTE system).

In the above-described embodiment, the LTE system is exemplified as the mobile communication system. However, the present application is not limited to the LTE system. The present application may be applied to systems other than the LTE system.

The entire content of Japanese Patent Application No. 2015-159045 (filed on Aug. 11, 2015) is incorporated in the present specification by reference.

INDUSTRIAL APPLICABILITY

The present application is useful in the field of radio communication.

The invention claimed is:

1. A base station operated in a specific frequency band for radio communication with a radio terminal, the specific frequency band being shared by a plurality of operators or a plurality of communication systems, the base station comprising:
a processor and a memory coupled to the processor, the processor configured to
receive first interference-related information from another base station through an interface that connects the base station and the another base station, the another base station being operated in the specific frequency band, the first interference-related information related to an interference signal transmitted from an interference source causing interference to the radio communication performed by the radio terminal on the specific frequency band, the interference source being another radio terminal,
identify the another base station as a specific base station located in a vicinity of the interference source, based on the first interference-related information, and
transmit request information to the another base station through the interface, the request information requesting the another base station to transmit a predetermined signal for stopping transmission of the interference signal by the interference source.

2. The base station according to claim 1, wherein
the specific frequency band is a frequency band required to be determined, before transmitting a radio signal by using the specific frequency band, whether or not the specific frequency band is available, and
the predetermined signal is a radio signal for causing the interference source to determine that the specific frequency band is in use.

3. The base station according to claim 1, wherein
the interference source includes at least one of another radio terminal of an operator different from an operator of the base station and another radio terminal of a communication system different from a communication system of the base station, and
the another base station is a base station of the same operator as the base station.

4. The base station according to claim 1, wherein
the processor is configured to transmit the transmission request information to the another base station, based on information obtained from the radio terminal and the another base station.

5. The base station according to claim 4, wherein
the interference signal is detected by the another base station.

6. The base station according to claim 4, wherein
the processor is configured to
receive, from the radio terminal, second interference-related information relating to the interference signal detected by the radio terminal, and
transmit, based on the first interference-related information and the second interference-related information, the transmission request information to the another base station.

7. The base station according to claim 5, wherein
the first interference-related information includes at least one of a detection timing of the interference signal, a signal parameter applied to the interference signal, and information included in the interference signal.

8. The base station according to claim 1, wherein
the processor is configured to transmit, to the another base station, stop request information requesting a transmission stop of the predetermined signal.

9. A base station operated in a specific frequency band for radio communication with a radio terminal, the specific frequency band being shared by a plurality of operators or a plurality of communication systems, the base station comprising:
a processor and a memory coupled to the processor, the processor configured to
transmit first interference-related information to another base station through an interface that connects the base station and the another base station, the another base station being operated in the specific frequency band, the first interference-related information related to an interference signal transmitted from an interference source causing interference to the radio communication performed by the radio terminal on the specific frequency band, the interference source being another radio terminal,
receive from the another base station through the interface, request information requesting transmission of a predetermined signal for stopping transmission of the interference signal by the interference source, the request information transmitted by the another base station in response to identifying the base station as a specific base station at the another base station based on the first interference-related information, the specific base station located in a vicinity of the interference source, and transmit the predetermined signal in response to receiving the request information.

* * * * *